(12) United States Patent
Sampath et al.

(10) Patent No.: US 10,443,477 B2
(45) Date of Patent: Oct. 15, 2019

(54) COUNTER-SWIRL MIXER

(71) Applicant: Tenneco Automotive Operating Company Inc., Lake Forest, IL (US)

(72) Inventors: Manoj K. Sampath, Ann Arbor, MI (US); Omkar Champhekar, Ann Arbor, MI (US); Yanping Zhang, Livonia, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 106 days.

(21) Appl. No.: 15/496,128

(22) Filed: Apr. 25, 2017

(65) Prior Publication Data

US 2018/0306083 A1    Oct. 25, 2018

(51) Int. Cl.
| | | |
|---|---|---|
| *F01N 3/28* | (2006.01) | |
| *B01F 5/06* | (2006.01) | |
| *F01N 3/20* | (2006.01) | |
| *F01N 13/00* | (2010.01) | |
| *B01F 5/04* | (2006.01) | |
| *B01F 3/04* | (2006.01) | |

(52) U.S. Cl.
CPC ........ *F01N 3/2892* (2013.01); *B01F 3/04049* (2013.01); *B01F 5/0473* (2013.01); *B01F 5/0606* (2013.01); *F01N 3/2066* (2013.01); *F01N 13/009* (2014.06); *F01N 2610/02* (2013.01)

(58) Field of Classification Search
CPC .. F01N 3/2892; F01N 3/2066; F01N 2610/02; B01F 3/04049; B01F 5/0473; B01F 5/0606

USPC .......................................................... 60/324
See application file for complete search history.

(56) References Cited

U.S. PATENT DOCUMENTS

| | | | |
|---|---|---|---|
| 4,966,253 A | 10/1990 | Stephens et al. | |
| 6,343,673 B1 | 2/2002 | Chang | |
| 7,510,172 B2 | 3/2009 | Kojima | |
| 7,614,211 B2 | 11/2009 | Chapin et al. | |
| 7,954,514 B2 | 6/2011 | Tung et al. | |
| 8,141,353 B2 * | 3/2012 | Zheng .................. | B01F 3/04049 60/324 |
| 8,609,030 B2 | 12/2013 | Wikaryasz et al. | |
| 9,022,641 B2 | 5/2015 | Nomura et al. | |

(Continued)

FOREIGN PATENT DOCUMENTS

WO    2003036056 A1    5/2003

*Primary Examiner* — Laert Dounis
*Assistant Examiner* — Kelsey L Stanek
(74) *Attorney, Agent, or Firm* — Harness, Dickey & Pierce, P.L.C.

(57) ABSTRACT

An aftertreatment system may include an exhaust gas passageway and a mixer assembly. The exhaust gas passageway may receive exhaust gas from an engine. The mixer assembly is disposed within the exhaust gas passageway and may include an upstream baffle, a downstream baffle, and a tube extending between and connected to the upstream and downstream baffles. The tube may include an inner surface defining a first flow path through the mixer assembly. The upstream and downstream baffles may be attached to each other, the tube and the exhaust gas passageway. The upstream and downstream baffles may cooperate to define a second flow path through the mixer assembly. The second flow path may extend in a rotational direction around an outer surface of the tube.

18 Claims, 8 Drawing Sheets

(56) References Cited

U.S. PATENT DOCUMENTS

| | | |
|---|---|---|
| 9,266,075 B2 | 2/2016 | Chapman et al. |
| 9,302,223 B2 | 4/2016 | Bui et al. |
| 9,410,464 B2 | 8/2016 | Hicks et al. |
| 9,534,525 B2 | 1/2017 | Dalimonte et al. |
| 9,581,067 B2 | 2/2017 | Guilbaud et al. |
| 2013/0091830 A1* | 4/2013 | Li .................. F01N 3/2892 60/295 |
| 2015/0040547 A1 | 2/2015 | Brockman et al. |
| 2016/0243510 A1 | 8/2016 | Denton et al. |
| 2016/0376969 A1 | 12/2016 | Zhang et al. |

\* cited by examiner

COUNTER-SWIRL MIXER

FIELD

The present disclosure relates to a counter-swirl mixer for an exhaust aftertreatment system.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems include a reductant delivery system for transmitting the reductant (e.g., urea) from a tank to the exhaust stream. A mixer may be provided for mixing the injected reductant with the exhaust gas before the reductant reaches a catalyst with which the reductant reacts. While these systems may have performed well in the past, it may be desirable to provide an improved mixing system that is able to fit in a limited packaging space and can more efficiently and effectively mix the reductant with the exhaust stream before the mixture reaches a catalyst.

SUMMARY

This section provides a general summary of the disclosure, and is not a comprehensive disclosure of its full scope or all of its features.

The present disclosure provides an aftertreatment system may include an exhaust gas passageway and a mixer assembly. The exhaust gas passageway may receive exhaust gas from an engine. The mixer assembly is disposed within the exhaust gas passageway and may include an upstream baffle, a downstream baffle, and a tube extending between and connected to the upstream and downstream baffles. The tube may include an inner surface defining a first flow path through the mixer assembly. The upstream and downstream baffles may be attached (e.g., fixedly attached or movably attached via a slip joint, for example) to each other, the tube and the exhaust gas passageway. The upstream and downstream baffles may cooperate to define a second flow path through the mixer assembly. The second flow path may extend in a rotational direction around an outer surface of the tube. The second flow path includes an inlet opening and an outlet opening. The inlet opening may be defined by the upstream baffle and disposed radially outward relative to the tube. The outlet opening may be defined by the downstream baffle and disposed radially outward relative to the tube and angularly offset relative to the inlet opening.

In some configurations, the upstream baffle includes a first blade and a second blade that is angularly spaced apart from the first blade. A radially extending edge of the first blade and a radially extending edge of the second blade may cooperate to define the inlet opening.

In some configurations, the downstream baffle includes at least one blade that extends radially outward relative to the tube and defines the outlet opening.

In some configurations, the upstream and downstream baffles cooperate to define a third flow path through the mixer assembly. The third flow path may extend around the outer surface of the tube in the same rotational direction as the second flow path. The third flow path includes an inlet opening and an outlet opening. The inlet opening of the third flow path may be defined by the upstream baffle and disposed radially outward relative to the tube. The outlet opening of the third flow path may be defined by the downstream baffle and disposed radially outward relative to the tube and angularly offset relative to the inlet opening of the third flow path. Another radially extending edge of the first blade and another radially extending edge of the second blade may cooperate to define the inlet opening of the third flow path.

In some configurations, the first, second and third flow paths are separate and distinct from each other.

In some configurations, the upstream baffle includes a central hub disposed between the first and second blades. The central hub may at least partially cover an open axial end of the tube and may include a plurality of apertures in communication with an interior of the tube. The apertures may define inlets of the first flow path.

In some configurations, the central hub includes a plurality of deflectors. Each of the deflectors may extend from an edge of a corresponding one of the apertures. The deflectors may be angled relative to a longitudinal axis of the tube such that the deflectors cause fluid flowing through the first flow path to swirl in a rotational direction opposite the rotational direction of the second flow path.

In some configurations, the radially extending edges of the first and second blades extend radially from the central hub to radially outermost peripheral edges of the first and second blades, respectively.

In some configurations, the first and second blades are flat and coplanar with each other. The at least one blade of the downstream baffle may be flat and parallel to the first and second blades.

In some configurations, the first and second blades contact an inner diametrical surface of the exhaust gas passageway. Each of the first and second blades may include a flange that is attached to the downstream baffle.

In some configurations, the at least one blade of the downstream baffle is disposed entirely downstream of the entire first blade and the entire second blade.

In some configurations, the upstream and downstream baffles are attached to each other by a flange that partially defines the inlet opening and the outlet opening.

The present disclosure also provides an aftertreatment system that may include an exhaust gas passageway and a mixer assembly. The exhaust gas passageway may receive exhaust gas from an engine. The mixer assembly may be fixedly disposed within the exhaust gas passageway and may define a first flow path, a second flow path, and a third flow path. The mixer assembly may include a first upstream blade, a second upstream blade, a first downstream blade, a second downstream blade, a tube, and a central hub. The central hub may at least partially cover an open end of the tube and may include apertures that cooperate with an interior of the tube to define the first flow path. The second flow path may include a first inlet opening and a first outlet opening and may extend around the tube in a rotational direction. A first radially extending edge of the first upstream blade and a first radially extending edge of the second upstream blade may cooperate to define the first inlet opening. A first radially extending edge of the first downstream blade and a first radially extending edge of the second downstream blade may cooperate to define the first outlet opening. The third flow path may include a second inlet opening and a second outlet opening and may extend around the tube in the rotational direction. A second radially extending edge of the first upstream blade and a second radially extending edge of the second upstream blade may cooperate to define the second inlet opening. A second radially extending edge of the first downstream blade and a second radially extending edge of the second downstream blade may cooperate to define the second outlet opening.

In some configurations, the first, second and third flow paths are separate and distinct from each other.

In some configurations, the central hub includes a plurality of deflectors. Each of the deflectors may extend from an edge of a corresponding one of the apertures. The deflectors may be angled relative to a longitudinal axis of the tube such that the deflectors cause fluid flowing through the first flow path to swirl in a rotational direction opposite the rotational direction of the second and third flow paths.

In some configurations, the first and second radially extending edges of the first upstream blade extend radially from the central hub to a radially outermost peripheral edge of the first upstream blade. The first and second radially extending edges of the second upstream blade may extend radially from the tube to a radially outermost peripheral edge of the second upstream blade.

In some configurations, the first and second upstream blades and the first and second downstream blades contact an inner diametrical surface of the exhaust gas passageway.

In some configurations, the first and second upstream blades are flat and coplanar with each other. The first and second downstream blades may be flat and coplanar with each other and may be parallel to the first and second upstream blades.

In some configurations, the first and second downstream blades disposed entirely downstream of the entire first upstream blade and the entire second upstream blade.

In some configurations, the first and second upstream blades and the central hub form an upstream baffle that forces a first portion of fluid in the exhaust gas passageway to flow through the first flow path, a second portion of fluid in the exhaust gas passageway to flow through the second flow path and a third portion of fluid in the exhaust gas passageway to flow through the third flow path. In some configurations, the first, second and third portions may comprise all of the fluid that flows through the exhaust gas passageway.

In some configurations, the first and second upstream blades and the central hub are integrally formed with each other.

In some configurations, the first inlet opening has an angular span of between 30 and 60 degrees; the second inlet opening has an angular span of between 30 and 60 degrees; the first outlet opening has an angular span of between 75 and 110 degrees; and the second outlet opening has an angular span of between 75 and 110 degrees.

In some configurations, the first upstream blade is integrally formed with one of the first and second downstream blades. The second upstream blade may be integrally formed with another one of the first and second downstream blades.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figures 1, 2:
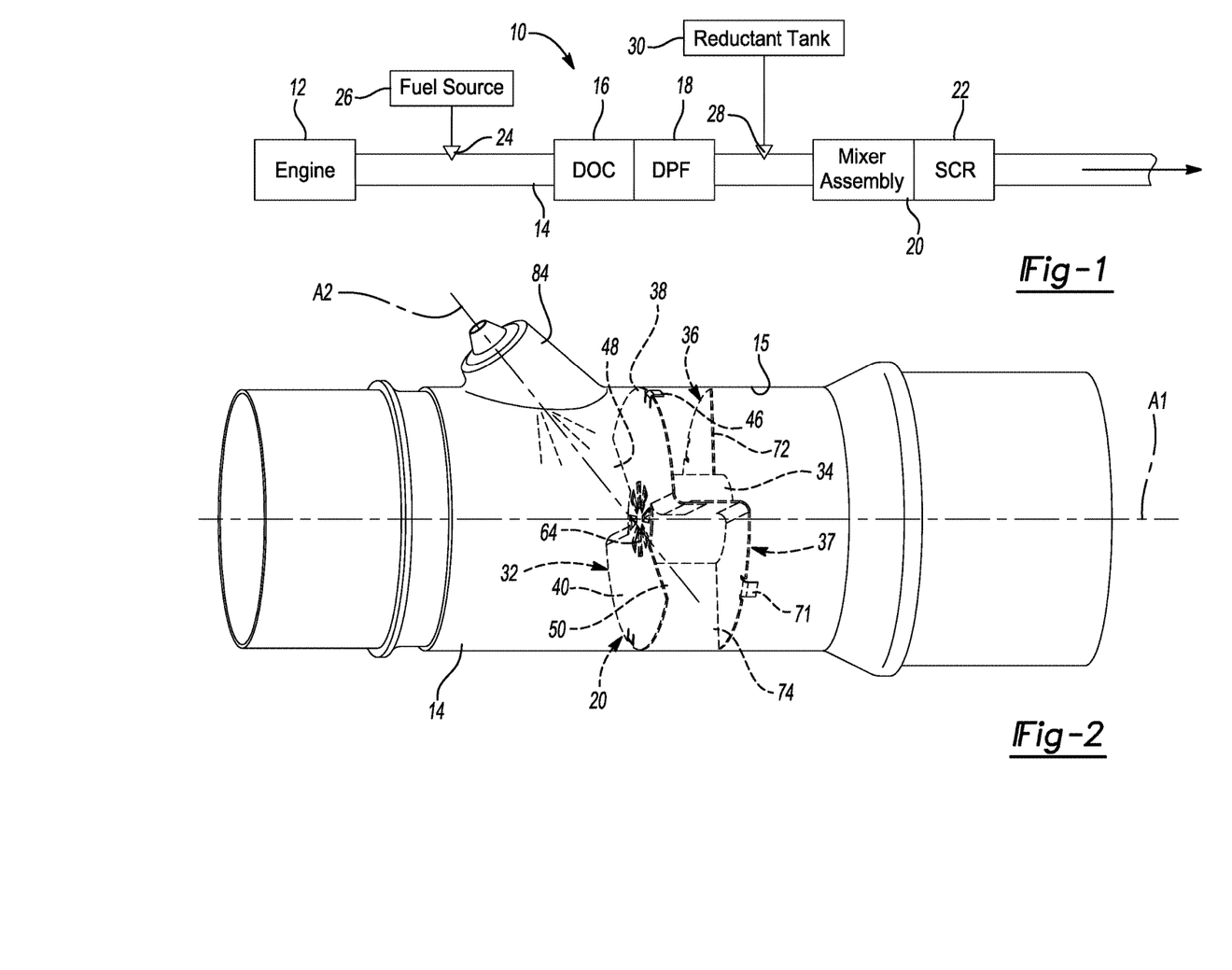
FIG. 1 is a schematic representation of an exhaust aftertreatment system having a mixer assembly according to the principles of the present disclosure.
FIG. 2 is a perspective view of the mixer assembly installed in an exhaust gas passageway.
Figures 3, 4:
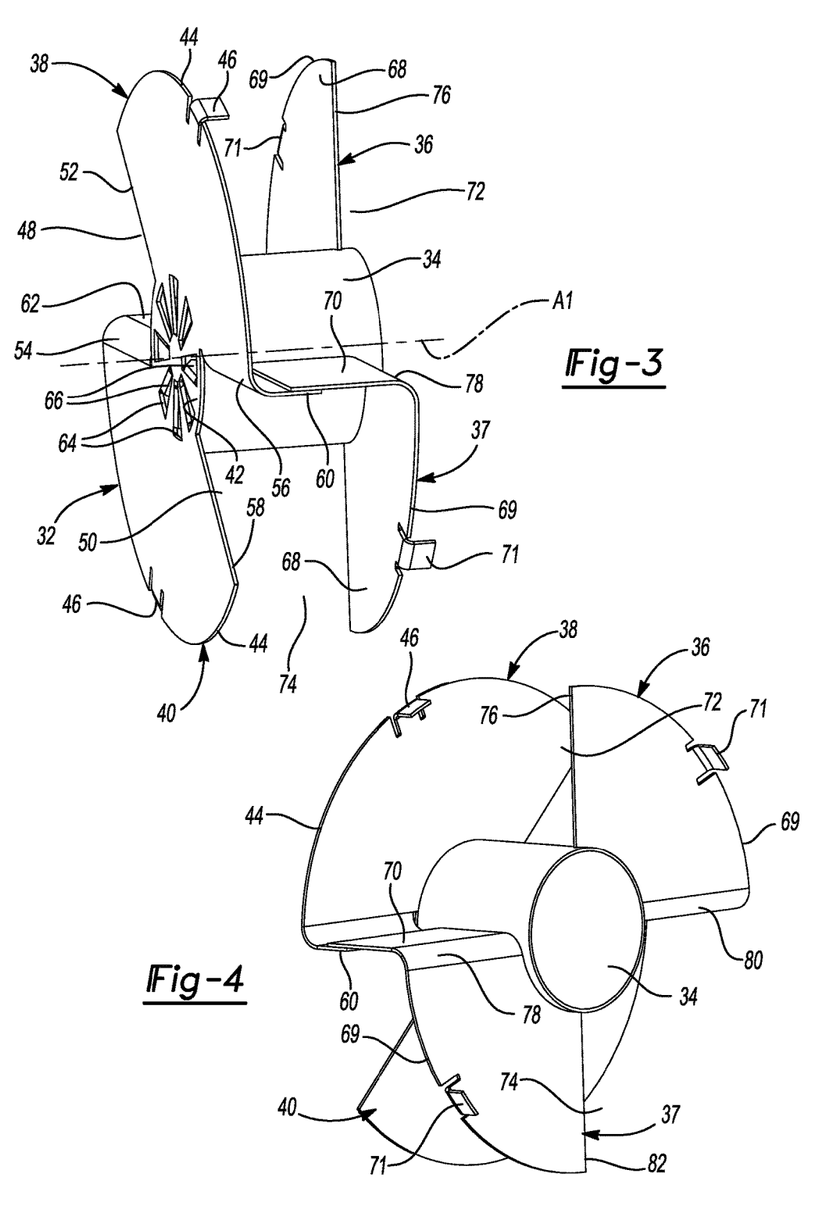
FIG. 3 is a perspective view of the mixer assembly.
FIG. 4 is another perspective view of the mixer assembly.
Figure 5:
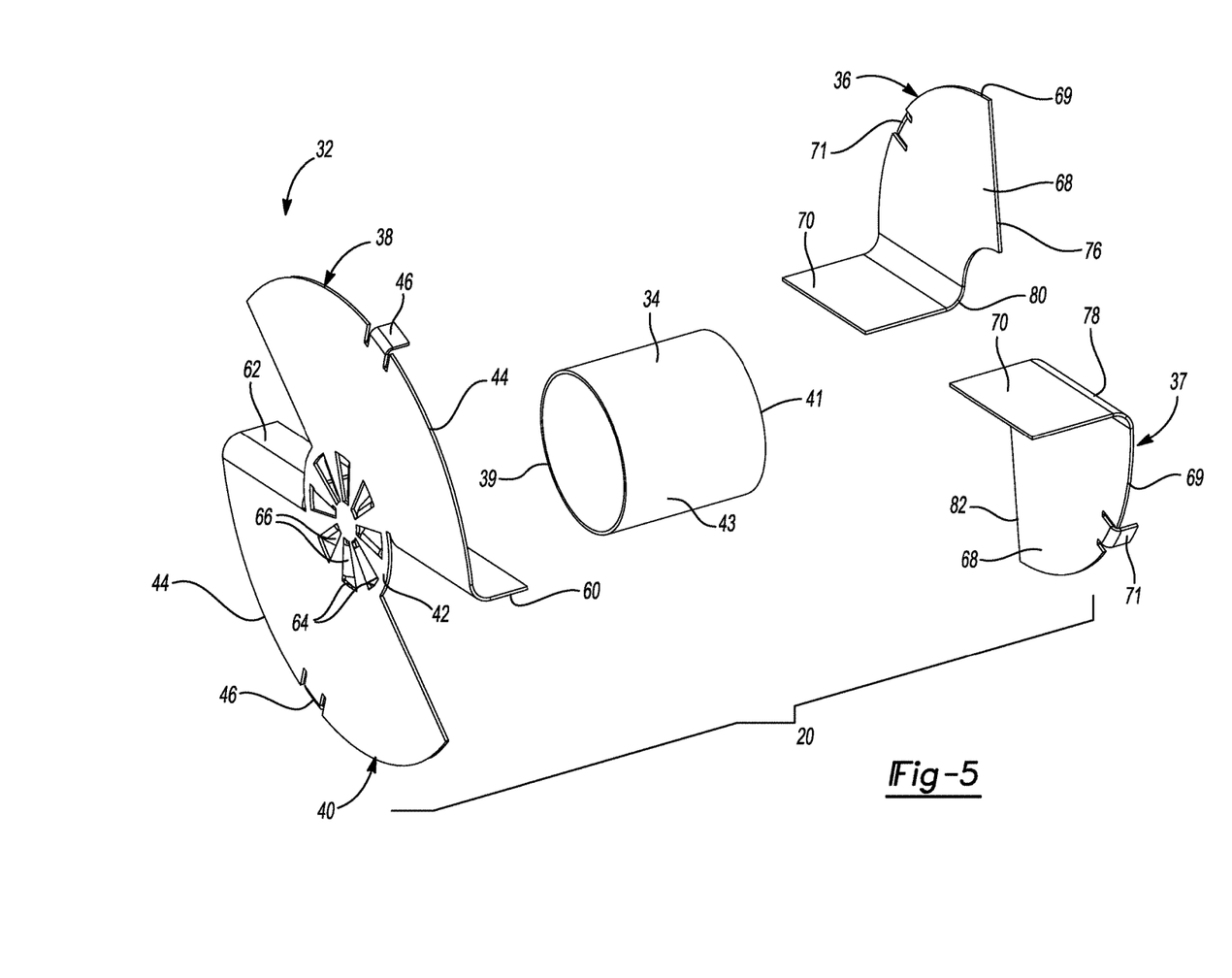
FIG. 5 is an exploded perspective view of the mixer assembly.

With reference to FIG. 1, an exhaust aftertreatment system 10 is provided that may treat exhaust gas output by a combustion engine 12. The exhaust aftertreatment system 10 may include an exhaust gas passageway 14, an oxidation catalyst (e.g., a diesel oxidation catalyst or DOC) 16, a filter (e.g., a diesel particulate filter (DPF)) 18, a mixer assembly 20 and a selective catalytic reduction (SCR) catalyst 22. The DOC 16, filter 18, mixer assembly 20 and SCR catalyst 22 are disposed within the exhaust gas passageway 14 such that some or all of the exhaust gas output from engine 12 flows therethrough.

A hydrocarbon (HC) injector 24 may be disposed in or adjacent to the exhaust gas passageway 14 at a location upstream of the DOC 16. The HC injector 24 may receive hydrocarbon fuel from a fuel source 26 and may inject the fuel into the stream of exhaust gas upstream of the DOC 16. A burner (not shown) may be disposed at least partially within the exhaust gas passageway 14 upstream of the DOC 16 at or adjacent the HC injector 24. The burner may ignite the fuel injected by the HC injector 24 to regenerate the DOC 16 and/or the filter 18.

A reductant injector 28 may be disposed in or adjacent to the exhaust gas passageway 14 at a location upstream of the mixer assembly 20, which is upstream of the SCR catalyst 22. The reductant injector 28 may receive a reductant (e.g., urea) from a reductant tank 30 and inject the reductant into an exhaust stream upstream of or in the mixer assembly 20. The reductant may mix with exhaust gas within the mixer assembly 20 prior to flowing through the SCR catalyst 22. The mixer assembly 20 may divide the flow of exhaust gas into at least two flow paths and facilitate atomization and evaporation of the reductant.

Referring now to FIGS. 2-7, the mixer assembly 20 may include an upstream baffle 32, a cylindrical tube 34, and downstream baffles 36, 37. In the particular configuration shown in FIGS. 2-7, the baffles 32, 36, 37 and the tube 34 are individually fabricated components that are welded and/or otherwise fixed to each other. In other configurations, however, one of more of the baffles 32, 36, 37 and tube 34 may be integrally formed with another one or more of the baffles 32, 36, 37 and tube 34. Furthermore, while the upstream baffle 32 shown in FIGS. 2-7 is formed as a single unitary component, in some configurations, the upstream baffle 32 can be formed from multiple components welded and/or otherwise fixed to each other.

The upstream baffle 32 may be a plate or sheet including a first wing or blade 38 and a second wing or blade 40 that extend radially outward from a central hub 42. The first and second upstream blades 38, 40 may be flat plates disposed on the same plane (e.g., a plane that is perpendicular to a longitudinal axis A1 (FIG. 3) of the tube 34, which may be collinear with or parallel to a longitudinal axis of a portion of the exhaust gas passageway 14 in which the mixer assembly 20 is installed, as shown in FIG. 2). The first and second blades 38, 40 may have outer peripheral edges 44 that have radii that are equal to or slightly smaller than a radius of a portion of the exhaust gas passageway 14 in which the mixer assembly 20 is installed. In this manner, there may be little or no space for fluid to flow between the outer peripheral edges 44 and an inner diametrical surface 15 of the exhaust gas passageway 14. Each of the blades 38, 40 may include a tab 46 that may be welded to the inner diametrical surface 15 of the exhaust gas passageway 14. It will be appreciated that the blades 38, 40 could have any number of tabs 46, and the tabs 46 could have any suitable length or shape. In some configurations, the blades 38, 40 could be spot welded to the inner diametrical surface 15.

Figure 6:
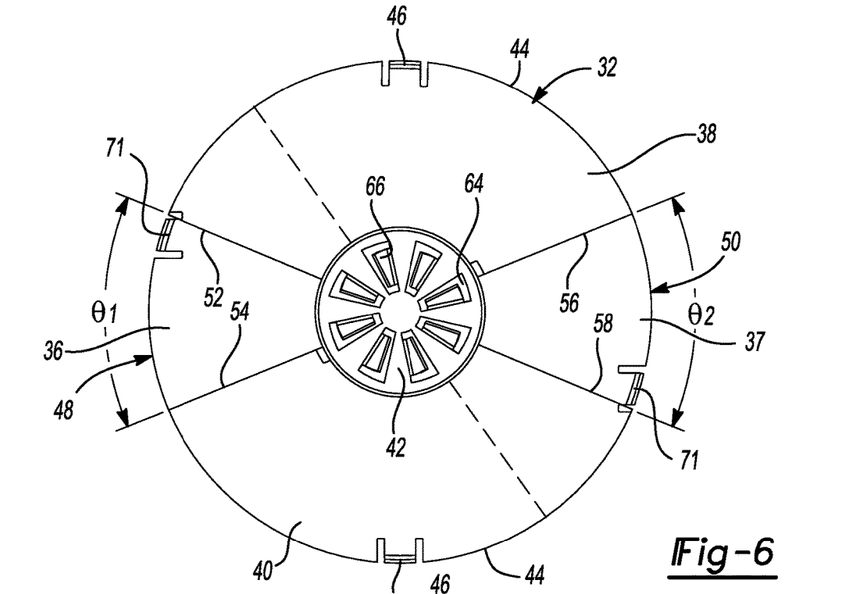
FIG. 6 is a plan view of an upstream end of the mixer assembly.

The first and second blades 38, 40 may cooperate to define first and second openings (i.e., inlet openings) 48, 50 therebetween. That is, the first opening 48 may be defined by and disposed angularly between a first radially extending edge 52 of the first blade 38 and a first radially extending edge 54 of the second blade 40; and the second opening 50 may be defined by and disposed angularly between a second radially extending edge 56 of the first blade 38 and a second radially extending edge 58 of the second blade 40. As shown in FIG. 6, the first opening 48 may span a first angle 81 between the radially extending edges 52, 54; and the second opening 50 may span a second angle 82 between the radially extending edges 56, 58. The angles 81, 82 may be the same or different and may be between about 30° and about 60°, for example.

The second edge 56 of the first blade 38 may be a curved or rounded edge, and a first flange 60 may extend from the second edge 56 toward the downstream baffle 37. Similarly, the first edge 54 of the second blade 40 may be a curved or rounded edge, and a second flange 62 may extend from the first edge 54 toward the downstream baffle 36.

The central hub 42 of the upstream baffle 32 may include a plurality of apertures 64 and a plurality of deflectors 66 arranged in a circular pattern about the longitudinal axis A1. The apertures 64 may extend entirely through the thickness of the central hub 42 and communicate with an interior 35 of the tube 34. The deflectors 66 may be partially cut or stamped out of the central hub 42 (thereby forming the apertures 64). The deflectors 66 may be bent inward into the tube 34 and at an angle relative to the longitudinal axis A1 such that the deflectors 66 cause fluid (exhaust gas and reductant) flowing through the apertures 64 into the tube 34 to swirl in a first rotational direction (e.g., counterclockwise when viewed from the frame of reference of FIGS. 2 and 3) about the longitudinal axis A1. The tube 34 is open at both axial ends 39, 41. Therefore, an inner diametrical surface of the tube 34 may define a first flow path. Fluid may flow enter the first flow path by flowing through the apertures 64 and into one open end 39 of the tube 34, and may exit first flow path by flowing out of the tube 34 through the opposite open end 41. As described above, the deflectors 66 may cause fluid flowing through the first flow path to swirl in the first rotational direction. In some configurations, however, the mixer assembly 20 does not include deflectors 66 at the apertures 64. Furthermore, the apertures 64 could have any suitable shape and arrangement.

The downstream baffles 36, 37 may be similar or identical to each other and may be angularly spaced apart from each other. Each of the baffles 36, 37 may include a wing or blade portion 68 and a flange portion 70. While the downstream baffles 36, 37 are shown in the figures as two separate components, in some configurations, the downstream baffles 36, 37 could be integrally formed as a single baffle with two (or more) blade portions 68 angularly spaced apart from each other. In such configurations, the two blade portions 68 could be connected to each other by a ring (not shown) that encircles and/or engages the tube 34, for example.

The downstream blades 68 may have outer peripheral edges 69 that have radii that are equal to or slightly smaller than a radius of a portion of the exhaust gas passageway 14 in which the mixer assembly 20 is installed. In this manner, there may be little or no space for fluid to flow between the outer peripheral edges 69 and the inner diametrical surface 15 of the exhaust gas passageway 14. Each of the blades 68 may include a tab 71 that may be welded to the inner diametrical surface 15 of the exhaust gas passageway 14. It will be appreciated that the blades 68 could have any number of tabs 71, and the tabs 71 could have any suitable length or shape. In some configurations, the blades 68 could be spot welded to the inner diametrical surface 15.

Figure 7:
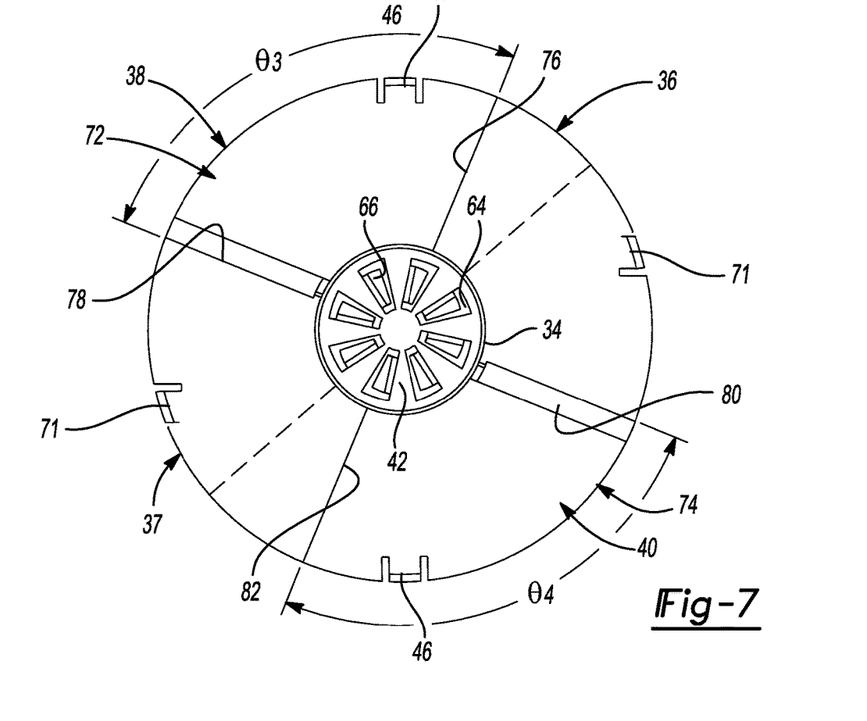
FIG. 7 is a plan view of an downstream end of the mixer assembly.

The blades 68 of the downstream baffles 36, 37 may cooperate to define third and fourth openings (i.e., outlet openings) 72, 74 therebetween. That is, the third opening 72 may be defined by and disposed angularly between a first radially extending edge 76 of the blade 68 of the baffle 36 and a first radially extending edge 78 of the blade 68 of the baffle 37; and the fourth opening 74 may be defined by and disposed angularly between a second radially extending edge 80 of the blade 68 of the baffle 36 and a second radially extending edge 82 of the blade 68 of the baffle 37. As shown in FIG. 7, the third opening 72 may span a third angle 83 between the radially extending edges 76, 78; and the fourth opening 74 may span a fourth angle 84 between the radially extending edges 80, 82. The angles 83, 84 may be the same or different from each other and may be between about 75° and about 110°, for example.

The second edge 80 of the blade 68 of the baffle 36 may be a curved or rounded edge, and the flange portion 70 of the baffle 36 may extend from the second edge 80 and fixedly engage (e.g., via welding) the flange 62 of the upstream baffle 32. Similarly, the first edge 78 of the blade 68 of the baffle 37 may be a curved or rounded edge, and the flange portion 70 of the baffle 37 may extend from the first edge 78 and fixedly engage (e.g., via welding) the flange 60 of the upstream baffle 32.

The first and second blades 38, 40 of the upstream baffle 32 force portions of the fluid (exhaust gas and reductant) to flow into the first opening 48, the second opening 50, or through the apertures 64 and the tube 34. As described above, the deflectors 66 cause fluid flowing through the apertures 64 to swirl in the first rotational direction. The upstream and downstream baffles 32, 36, 37 may cooperate to cause fluid that flows through the first and second openings 48, 50 to swirl in a second rotational direction (e.g., clockwise when viewed from the frame of reference of FIGS. 2 and 3) about the longitudinal axis A1. That is, fluid that flows into the first opening 48 must flow in the second direction around an outer diametrical surface 43 of the tube 34 to the third opening 72 (i.e., a second flow path extends around the tube 34 from the first opening 48 to the third opening 72); and fluid that flows into the second opening 50 must flow in the second direction around the outer diametrical surface 43 of the tube 34 to the fourth opening 74 (i.e., a third flow path extends around the tube 34 from the second opening 50 to the fourth opening 74). In this manner, the mixer assembly 20 causes a first portion of the fluid flowing through the exhaust gas passageway 14 (i.e., the portion flowing through the first flow path described above) to flow in the first rotational direction, and causes second and third portions of the fluid flowing through the exhaust gas passageway 14 (i.e., the portions flowing through the second and third flow paths described above) to flow in the second direction opposite the first direction. The first, second and third flow paths may be separate and distinct from each other (e.g., separated from each other by the cylindrical wall of the tube 34 and/or by the flanges 60, 62, 70) as they extend between the upstream and downstream baffles 32, 36, 37.

Swirling the fluid in opposite rotational directions may increase turbulence, which improves mixing of the reductant and exhaust gas. Furthermore, the swirling flow paths increase the effective length that the fluid must travel between the injector 28 and the catalyst 22. The longer effective length allows more time and distance over which the reductant and exhaust gas can mix upstream of the catalyst 22. Furthermore, configuration of the mixer assembly 20 reduces backpressure in the exhaust gas passageway 14 as compared to prior-art mixing devices.

As shown in FIG. 2, the exhaust gas passageway 14 may include an injector housing 84 that may receive the injector 28. The injector housing 84 may include a longitudinal axis A2 that may be disposed at an angle (e.g., a non-perpendicular angle or a perpendicular angle) relative to the longitudinal axis A1. As shown in FIG. 2, the longitudinal axis A2 may extend through the central hub 42 of the upstream baffle 32. In some configurations, the mixer assembly 20 may be located upstream or downstream of the intersection of the axis A2 and the longitudinal axis of the exhaust gas passageway 14. In some configurations, the mixer assembly 20 may be oriented within the exhaust gas passageway 14 such that the angular center of the first blade 38 of the upstream baffle 32 is angularly aligned with the injector housing 84 and injector 28. That is, assuming the rotational position of the injector housing 84 is defined as the twelve o'clock position, the angular center of the first blade 38 of the upstream baffle 32 can be positioned at the twelve o'clock position and the first and second openings 48, 50 can be positioned at the nine o'clock and three o'clock positions, respectively. Other rotational positions of the mixer assembly 20 are also within the scope of the present disclosure.

While the tube 34 is described above and shown in the figures as a cylindrical tube (i.e., with a circular cross section), in some configurations, the tube 34 could have an oval cross section or a polygonal cross section, for example. In some configurations, the tube 34 may be frusto-conical (rather than cylindrical). In some configurations, the tube 34 could include apertures that allow for fluid communication between the flow paths through the mixer assembly 20. In some configurations, the longitudinal axis of the tube 34 may be offset from the longitudinal axis (i.e., the center axis) of the mixer assembly 20. The positioning of the tube 34 at least partially defines the locations at which the fluid flow diverges and converges.

Furthermore, while the downstream baffles 36, 37 are described above as being two baffles each having a blade 68, the downstream baffles 36, 37 could be termed a single baffle (e.g., a two-piece baffle) having two blades 68 (e.g., first and second downstream blades).

Figures 8, 9:
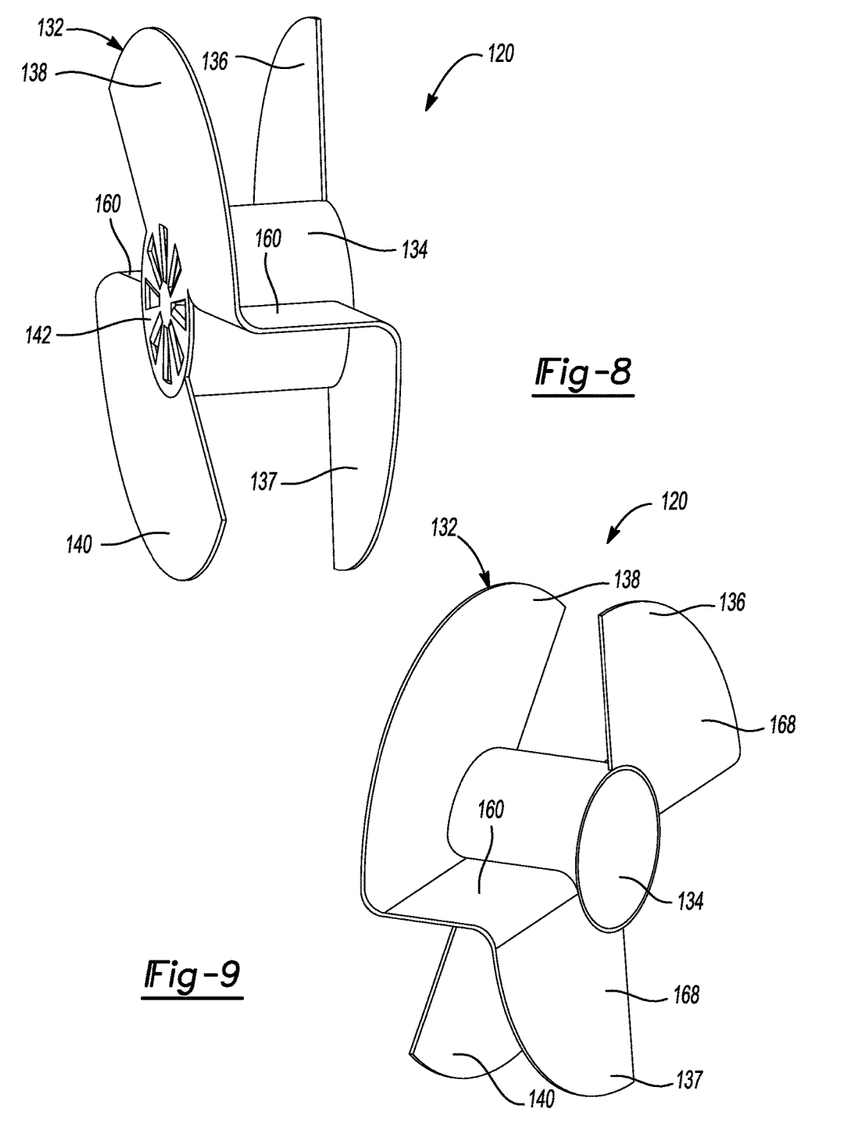
FIG. 8 is a perspective view of another mixer assembly according to the principles of the present disclosure.
FIG. 9 is another perspective view of the mixer assembly of FIG. 8.

Referring now to FIGS. 8 and 9, another mixer assembly 120 is provided that can be installed in the exhaust gas passageway 14 instead of or in addition to the mixer assembly 20. The structure and function of the mixer assembly 120 may be similar or identical to that of the mixer assembly 20 described above, apart from any exceptions described below. Therefore, similar features will not be described again in detail.

Like the mixer assembly 20, the mixer assembly 120 may include an upstream baffle 132, a cylindrical tube 134, and downstream baffles 136, 137. The baffles 132, 136, 137 may be integrally formed as a single component. Alternatively, a first blade 138 and a central hub 142 of the upstream baffle 132 may be integrally formed with the baffle 137 from a first sheet or plate of material; and a second blade 140 of the upstream baffle 132 may be integrally formed with the baffle 136 from a second sheet or plate of material. For example, a single continuous flange 160 may extend from the first blade 138 to a blade 168 of the baffle 137; and another single continuous flange 160 may extend from the second blade 140 to a blade 168 of the baffle 136. The continuous flanges 160 may have smooth surfaces that are free from sharp edges on which urea deposits can form. One of the flanges 160 may partially define the inlet opening and the outlet opening of one of the flow paths through the mixer assembly 120, and the other one of flanges 160 may partially define the inlet opening and the outlet opening of another one of the flow paths through the mixer assembly 120.

Figure 10:
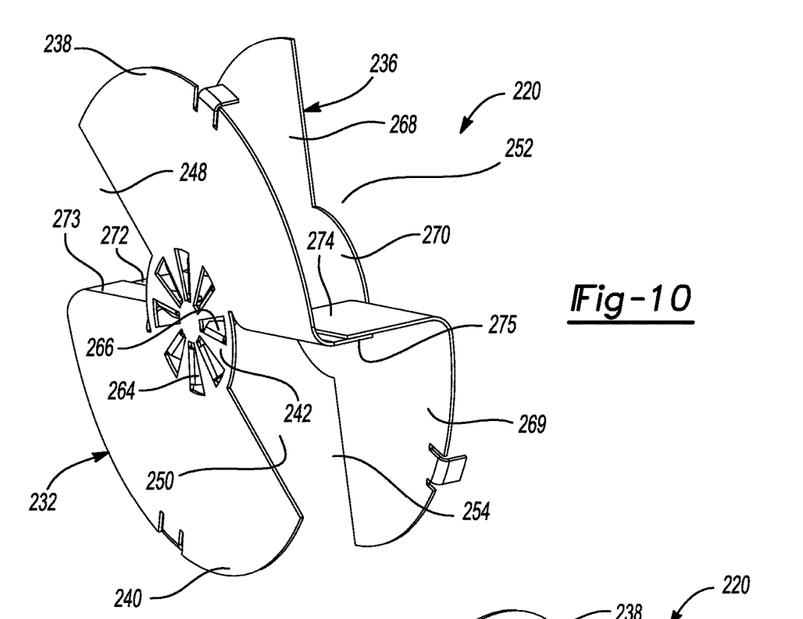
FIG. 10 is a perspective view of yet another mixer assembly according to the principles of the present disclosure.
Figure 11:
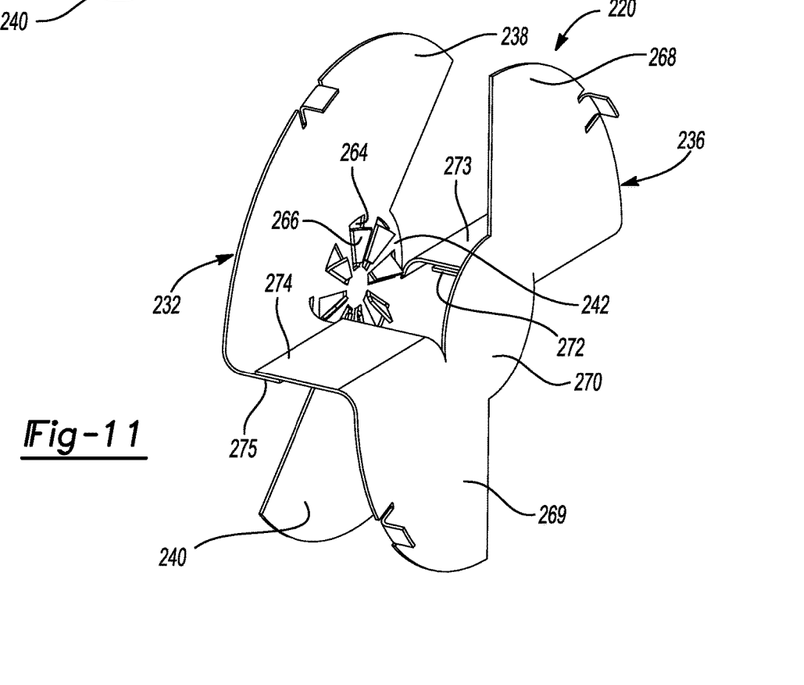
FIG. 11 is another perspective view of the mixer assembly of FIG. 10.

Referring now to FIGS. 10 and 11, another mixer assembly 220 is provided that can be installed in the exhaust gas passageway 14 instead of or in addition to the mixer assembly 20. The mixer assembly 220 may include an upstream baffle 232 and a downstream baffle 236. The structure and function of the upstream baffle 232 may be similar or identical to that of the upstream baffle 32 described above. Therefore, similar features will not be described again in detail. Briefly, the upstream baffle 232 may include a first blade 238 (like the first blade 38), a second blade 240 (like the second blade 40), and a central hub 242 (like the central hub 42).

The downstream baffle 236 may include first and second blades 268, 269 and a central hub 270. The blades 268, 269 may be similar or identical to the blades 68 of the baffles 36, 37 described above. A flange 272 extending from the first blade 268 of the downstream baffle 236 may engage (e.g., via welding) a flange 273 extending from the second blade 240 of the upstream baffle 232. A flange 274 extending from the second blade 269 of the downstream baffle 236 may engage (e.g., via welding) a flange 275 extending from the first blade 238 of the upstream baffle 232. The central hub 270 may be disposed between and integrally formed with the blades 268, 269. The central hub 270 may be aligned with the central hub 242 along the longitudinal axis A1.

In the same or similar manner as described above with respect to the mixer assembly 20, the upstream and downstream baffles 232, 236 cooperate to cause a portion of the fluid flowing through the exhaust gas passageway 14 to flow in the first rotational direction, and cause another portion of the fluid flowing through the exhaust gas passageway 14 to flow in the second direction (opposite the first direction). That is, deflectors 266 cause fluid flowing through apertures 264 in the central hub 242 to swirl in the first rotational direction. Fluid flow that is radially outside of the central hub 242 may flow either through openings 248, 252 (like openings 48, 72, respectively) defined by the baffles 232, 236 or through openings 250, 254 (like openings 50, 74, respectively) defined by the baffles 232, 236. The blades 238, 240, 268, 269 force the fluid flowing between the openings 248, 252 and fluid flowing between the openings 250, 254 to swirl in the second rotational direction.

Figure 12:
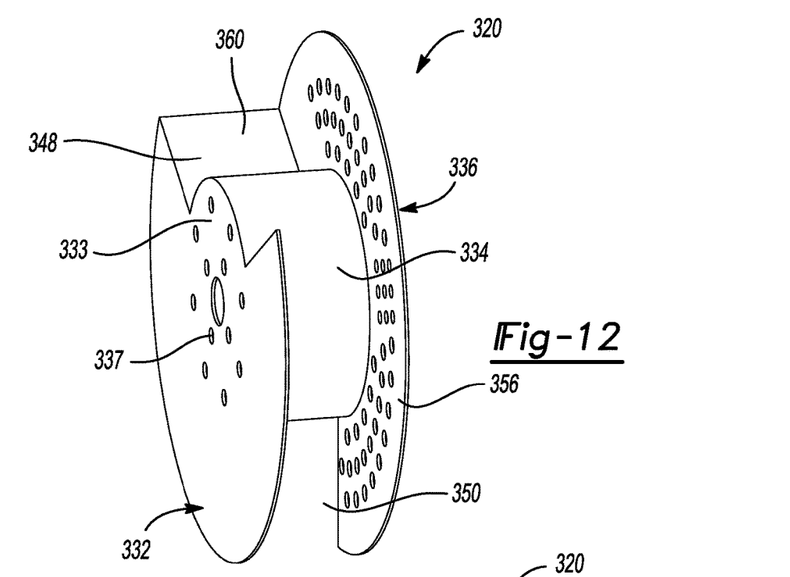
FIG. 12 is a perspective view of yet another mixer assembly according to the principles of the present disclosure.
Figure 13:
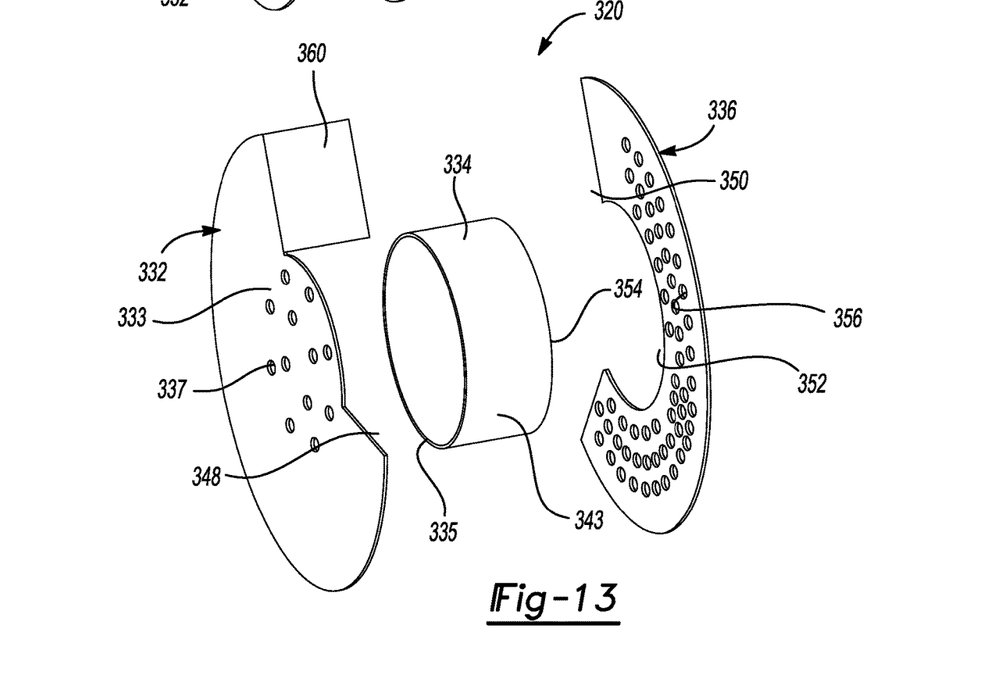
FIG. 13 is an exploded perspective view of the mixer assembly of FIG. 12.
Figure 14:
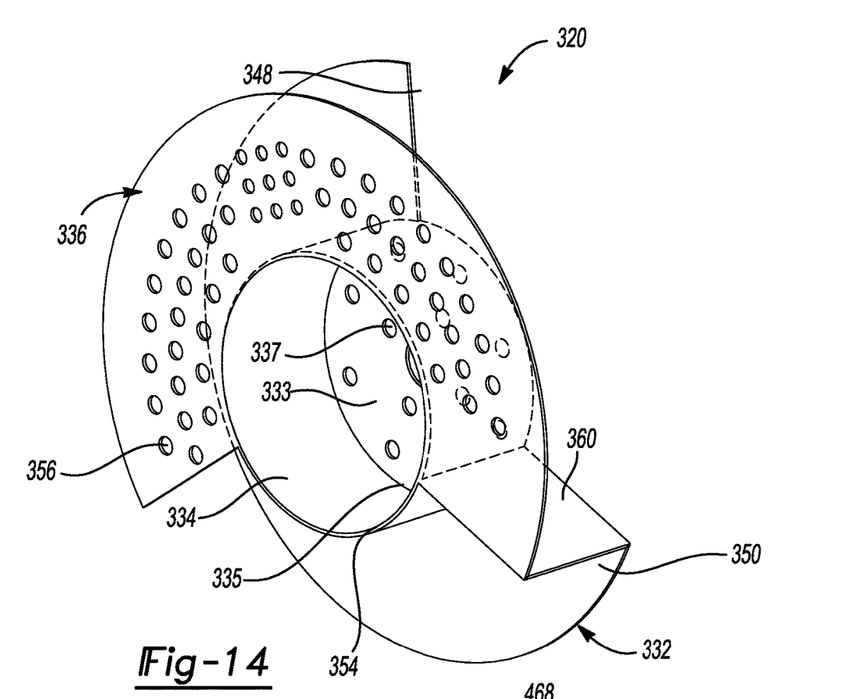
FIG. 14 is another perspective view of the mixer assembly of FIG. 12.

Referring now to FIGS. 12-14, another mixer assembly 320 is provided that can be installed in the exhaust gas passageway 14 instead of or in addition to the mixer assembly 20. The mixer assembly 320 may include an upstream baffle 332, a cylindrical tube 334, and a downstream baffle 336. The upstream baffle 332 may be a generally circular, flat disk with a cutout or opening 348. A central portion 333 of the upstream baffle 332 may cover an upstream open end 335 of the tube 334. A plurality of apertures 337 may be formed in the central portion 333 that are in communication with the interior of the tube 334. In some configurations, the central portion 333 may include a plurality of deflectors (not shown) that cause fluid flowing through the apertures 337 and the tube 334 to swirl about the longitudinal axis A1.

The downstream baffle 336 may be a generally circular (or semicircular), flat disk with an outer cutout or outer opening 350 that is angularly spaced apart from the opening 348 and a central opening 352 (FIG. 13) in communication with a downstream open end 354 of the tube 334. The downstream baffle 336 may also include a plurality of apertures 356. A flange 360 may extend from the upstream baffle 332 and fixedly engage (e.g., via welding) the downstream baffle 336. The flange 360 may partially define the opening 348.

A portion of the fluid in the exhaust gas passageway 14 may flow through the apertures 337 in the first baffle 332 and through the tube 334. Another portion of the fluid in the exhaust gas passageway 14 may flow through the opening 348 and may flow around an outer diametrical surface 343 of the tube 334 in a rotational direction (e.g., clockwise when viewed from the frame of reference of FIG. 12) and flow either through the apertures 356 in the downstream baffle 336 or through the opening 350.

Figure 15:
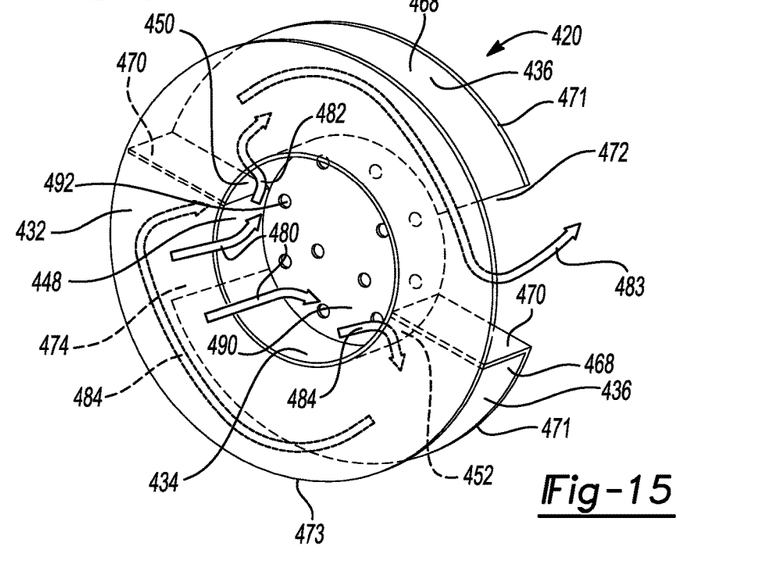
FIG. 15 is a perspective view of yet another mixer assembly according to the principles of the present disclosure.

Referring now to FIG. 15, another mixer assembly 420 is provided that can be installed in the exhaust gas passageway 14 instead of or in addition to the mixer assembly 20. The mixer assembly 420 may include an upstream baffle 432, a tube 434, and downstream baffles 436. The upstream baffle 432 may be an annular disk having a central opening 448 that is axially aligned with (i.e., along the longitudinal axis A1) the tube 434 and is in communication with the interior of the tube 434. The tube 434 may include a pair of openings 450, 452 that extend through inner and outer diametrical surfaces of the tube 434 and are in communication with the opening 448 in the upstream baffle 432.

The downstream baffles 436 may be identical to each other and are angularly offset from each other. Each of the downstream baffles 436 may include a blade portion 468 and a flange portion 470. The blade portions 468 may be coplanar and may be parallel to the upstream baffle 432. Outer peripheral edges 471 of the downstream baffles 436 may have the same or similar radii as outer peripheral edges 473 of the upstream baffle 432 and the portion of the exhaust gas passageway 14 in which the mixer assembly 420 is installed.

Fluid in the exhaust gas passageway 14 may flow axially through the opening 448 and into the tube 434, as indicated by arrows 480. A portion of the fluid in the tube 434 may then flow radially out of the tube 434 through the opening 450 (as indicated by arrow 482), and then flow around the tube 434 in a rotational direction and out of the mixer assembly 420 through an opening 472 between the downstream baffles 436 (as indicated by arrow 483). Another portion of the fluid in the tube 434 may flow radially out of the tube 434 through the opening 452, and then flow around the tube 434 in the rotational direction and out of the mixer assembly 420 through another opening 474 between the downstream baffles 436 (as indicated by arrow 484). In some configurations, the tube 434 may include an axial end plate 490 having a plurality of apertures 492 through which yet another portion of the fluid in the tube 434 may flow.

In any of the mixer assemblies 20, 120, 320, 420 described above, the tube 34, 134, 334, 434 can be formed in any suitable manner and/or attached to the baffles in any suitable manner. For example, the tube 34, 134, 334, 434 could be formed from the same sheet of plate as one or more of the baffles in a draw operation. Alternatively, a separately formed tube could be attached to lips, ridges, or flanges formed on the baffles.

The configurations of the mixer assemblies 20, 120, 320, 420 described above and shown in the figures impart a swirling motion on the fluid in the exhaust gas passageway 14 in one or more directions to increase the effective length that the fluid must travel between the injector 28 and the catalyst 22. As described above, the longer effective length allows more time and distance over which the reductant and exhaust gas can mix upstream of the catalyst 22. Furthermore, the mixer assemblies 20, 120, 320, 420 described above are compact in size and reduce backpressure in the exhaust gas passageway 14 as compared to prior-art mixing devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aftertreatment system comprising:
an exhaust gas passageway receiving exhaust gas from an engine; and
a mixer assembly disposed within the exhaust gas passageway and including an upstream baffle, a downstream baffle, and a tube extending between and connected to the upstream and downstream baffles, the tube including an inner surface defining a first flow path through the mixer assembly, the upstream and downstream baffles cooperating to define a second flow path through the mixer assembly, the second flow path extending in a rotational direction around an outer surface of the tube,
wherein the second flow path includes an inlet opening and an outlet opening, the inlet opening is defined by the upstream baffle and disposed radially outward relative to the tube, the outlet opening is defined by the downstream baffle and disposed radially outward relative to the tube and angularly offset relative to the inlet opening, wherein the upstream and downstream baffles are attached to each other by a flange, wherein the flange partially defines the inlet opening and the outlet opening.

2. The aftertreatment system of claim 1, wherein the upstream baffle includes a first blade and a second blade that is angularly spaced apart from the first blade, and wherein a radially extending edge of the first blade and a radially extending edge of the second blade cooperate to define the inlet opening.

3. The aftertreatment system of claim 2, wherein the downstream baffle includes at least one blade that extends radially outward relative to the tube and defines the outlet opening, and wherein the at least one blade of the downstream baffle is disposed entirely downstream of the entire first blade and the entire second blade.

4. The aftertreatment system of claim 3, wherein the upstream and downstream baffles cooperate to define a third flow path through the mixer assembly, the third flow path extending around the outer surface of the tube in the same rotational direction as the second flow path, and wherein the third flow path includes an inlet opening and an outlet opening, the inlet opening of the third flow path is defined by the upstream baffle and disposed radially outward relative to the tube, the outlet opening of the third flow path is defined by the downstream baffle and disposed radially outward relative to the tube and angularly offset relative to the inlet opening of the third flow path, and wherein another radially extending edge of the first blade and another radially extending edge of the second blade cooperate to define the inlet opening of the third flow path.

5. The aftertreatment system of claim 4, wherein the first, second and third flow paths are separate and distinct from each other.

6. The aftertreatment system of claim 5, wherein the upstream baffle includes a central hub disposed between the first and second blades, wherein the central hub at least partially covers an open axial end of the tube and includes a plurality of apertures in communication with an interior of the tube, and wherein the apertures define inlets of the first flow path.

7. The aftertreatment system of claim 6, wherein the central hub includes a plurality of deflectors, each of the deflectors extends from an edge of a corresponding one of the apertures, the deflectors are angled relative to a longitudinal axis of the tube such that the deflectors cause fluid flowing through the first flow path to swirl in a rotational direction opposite the rotational direction of the second flow path.

8. The aftertreatment system of claim 7, wherein the radially extending edges of the first and second blades extend radially from the central hub to radially outermost peripheral edges of the first and second blades, respectively.

9. An aftertreatment system comprising:
an exhaust gas passageway receiving exhaust gas from an engine; and
a mixer assembly disposed within the exhaust gas passageway and including an upstream baffle, a downstream baffle, and a tube extending between and connected to the upstream and downstream baffles, the tube including an inner surface defining a first flow path through the mixer assembly, the upstream and downstream baffles cooperating to define a second flow path through the mixer assembly, the second flow path extending in a rotational direction around an outer surface of the tube,
wherein the second flow path includes an inlet opening and an outlet opening, the inlet opening is defined by the upstream baffle and disposed radially outward relative to the tube, the outlet opening is defined by the downstream baffle and disposed radially outward relative to the tube and angularly offset relative to the inlet opening,
wherein the upstream baffle includes a first blade and a second blade that is angularly spaced apart from the first blade, and wherein a radially extending edge of the first blade and a radially extending edge of the second blade cooperate to define the inlet opening,
wherein the downstream baffle includes at least one blade that extends radially outward relative to the tube and defines the outlet opening, and wherein the at least one blade of the downstream baffle is disposed entirely downstream of the entire first blade and the entire second blade,
wherein the first and second blades are flat and coplanar with each other, and wherein the at least one blade of the downstream baffle is flat and is parallel to the first and second blades.

10. An aftertreatment system comprising:
an exhaust gas passageway receiving exhaust gas from an engine; and
a mixer assembly disposed within the exhaust gas passageway and including an upstream baffle, a downstream baffle, and a tube extending between and connected to the upstream and downstream baffles, the tube including an inner surface defining a first flow path through the mixer assembly, the upstream and downstream baffles cooperating to define a second flow path through the mixer assembly, the second flow path extending in a rotational direction around an outer surface of the tube,
wherein the second flow path includes an inlet opening and an outlet opening, the inlet opening is defined by the upstream baffle and disposed radially outward relative to the tube, the outlet opening is defined by the downstream baffle and disposed radially outward relative to the tube and angularly offset relative to the inlet opening,
wherein the upstream baffle includes a first blade and a second blade that is angularly spaced apart from the first blade, and wherein a radially extending edge of the first blade and a radially extending edge of the second blade cooperate to define the inlet opening,
wherein the first and second blades contact an inner diametrical surface of the exhaust gas passageway, and wherein each of the first and second blades includes a flange that is attached to the downstream baffle.

11. An aftertreatment system comprising:
an exhaust gas passageway receiving exhaust gas from an engine; and
a mixer assembly disposed within the exhaust gas passageway and defining a first flow path, a second flow path, and a third flow path, the mixer assembly including a first upstream blade, a second upstream blade, a first downstream blade, a second downstream blade, a tube, and a central hub, the central hub at least partially covering an open end of the tube and including apertures that cooperate with an interior of the tube to define the first flow path,
wherein the second flow path includes a first inlet opening and a first outlet opening and extends around the tube in a rotational direction, wherein a first radially extending edge of the first upstream blade and a first radially extending edge of the second upstream blade cooperate to define the first inlet opening, and wherein a first radially extending edge of the first downstream blade and a first radially extending edge of the second downstream blade cooperate to define the first outlet opening,
wherein the third flow path includes a second inlet opening and a second outlet opening and extends around the tube in the rotational direction, wherein a second radially extending edge of the first upstream blade and a second radially extending edge of the second upstream blade cooperate to define the second inlet opening, and wherein a second radially extending edge of the first downstream blade and a second radially extending edge of the second downstream blade cooperate to define the second outlet opening, wherein the first and second upstream blades and the first and second downstream blades contact an inner diametrical surface of the exhaust gas passageway.

12. The aftertreatment system of claim 11, wherein the first, second and third flow paths are separate and distinct from each other.

13. The aftertreatment system of claim 11, wherein the central hub includes a plurality of deflectors, each of the deflectors extends from an edge of a corresponding one of the apertures, the deflectors are angled relative to a longitudinal axis of the tube such that the deflectors cause fluid flowing through the first flow path to swirl in a rotational direction opposite the rotational direction of the second and third flow paths.

14. The aftertreatment system of claim 11, wherein the first and second radially extending edges of the first upstream blade extend radially from the central hub to a radially outermost peripheral edge of the first upstream blade, and wherein the first and second radially extending edges of the second upstream blade extend radially from the tube to a radially outermost peripheral edge of the second upstream blade.

15. The aftertreatment system of claim 11, wherein the first and second upstream blades are flat and coplanar with each other, and wherein the first and second downstream blades are flat and coplanar with each other and are parallel to the first and second upstream blades.

16. The aftertreatment system of claim 11, wherein the first and second downstream blades disposed entirely downstream of the entire first upstream blade and the entire second upstream blade.

17. An aftertreatment system comprising:
an exhaust gas passageway receiving exhaust gas from an engine; and
a mixer assembly disposed within the exhaust gas passageway and defining a first flow path, a second flow path, and a third flow path, the mixer assembly including a first upstream blade, a second upstream blade, a first downstream blade, a second downstream blade, a tube, and a central hub, the central hub at least partially covering an open end of the tube and including apertures that cooperate with an interior of the tube to define the first flow path, wherein the second flow path includes a first inlet opening and a first outlet opening and extends around the tube in a rotational direction, wherein a first radially extending edge of the first upstream blade and a first radially extending edge of the second upstream blade cooperate to define the first inlet opening, and wherein a first radially extending edge of the first downstream blade and a first radially extending edge of the second downstream blade cooperate to define the first outlet opening, wherein the third flow path includes a second inlet opening and a second outlet opening and extends around the tube in the rotational direction, wherein a second radially extending edge of the first upstream blade and a second radially extending edge of the second upstream blade cooperate to define the second inlet opening, and wherein a second radially extending edge of the first downstream blade and a second radially extending edge of the second downstream blade cooperate to define the second outlet opening, wherein the first and second upstream blades and the central hub form an upstream baffle that forces a first portion of fluid in the exhaust gas passageway to flow through the first flow path, a second portion of fluid in the exhaust gas passageway to flow through the second flow path and a third portion of fluid in the exhaust gas passageway to flow through the third flow path, and wherein the first, second and third portions comprise all of the fluid that flows through the exhaust gas passageway.

18. The aftertreatment system of claim 17, wherein the first inlet opening has an angular span of between 30 and 60 degrees, wherein the second inlet opening has an angular span of between 30 and 60 degrees, wherein the first outlet opening has an angular span of between 75 and 110 degrees, and wherein the second outlet opening has an angular span of between 75 and 110 degrees.

* * * * *